United States Patent Office 2,939,221
Patented June 7, 1960

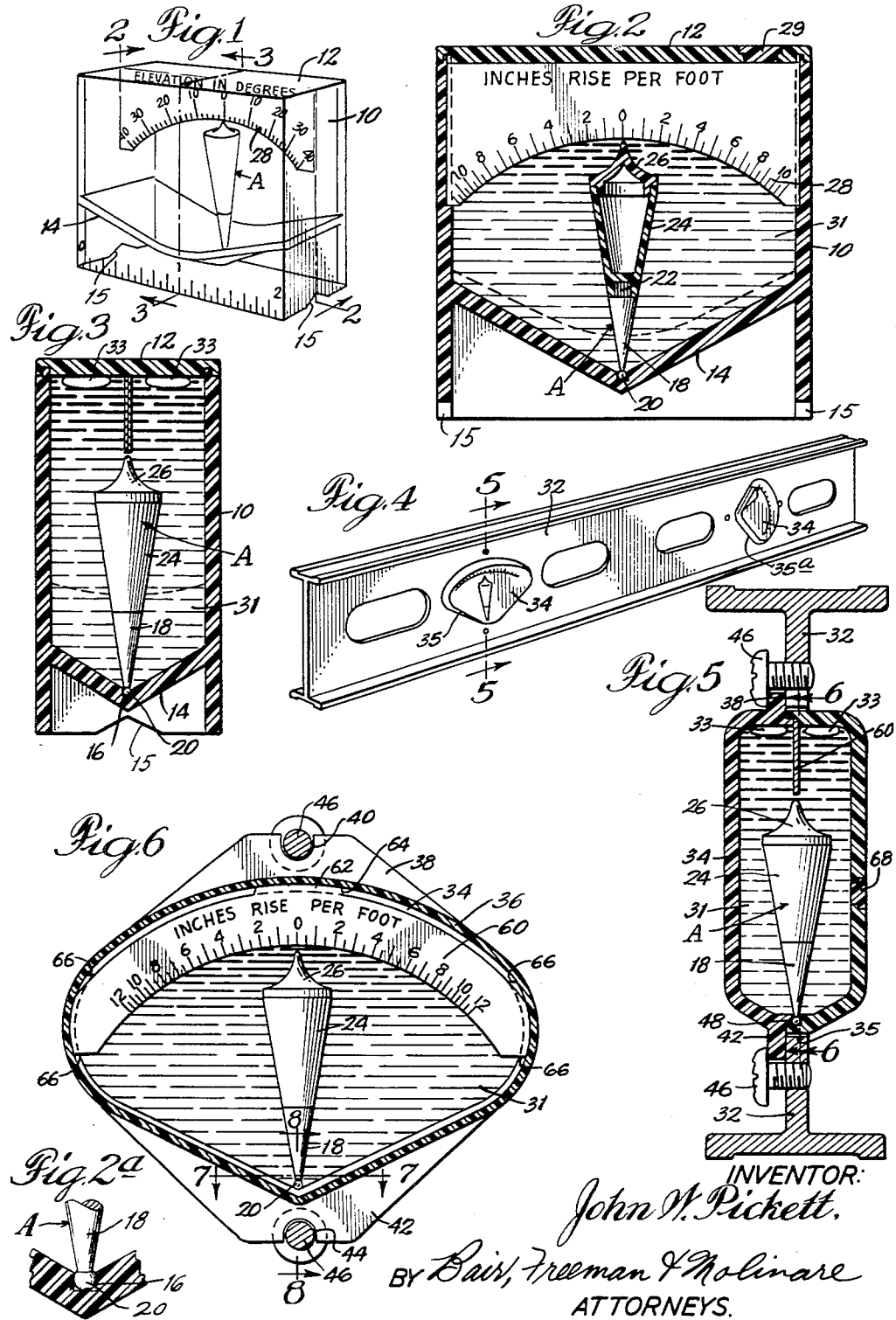

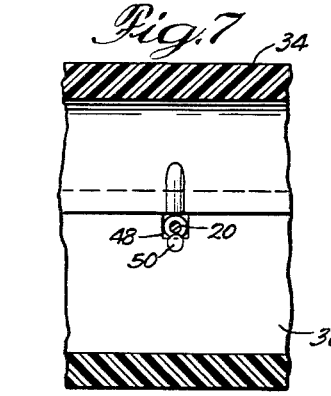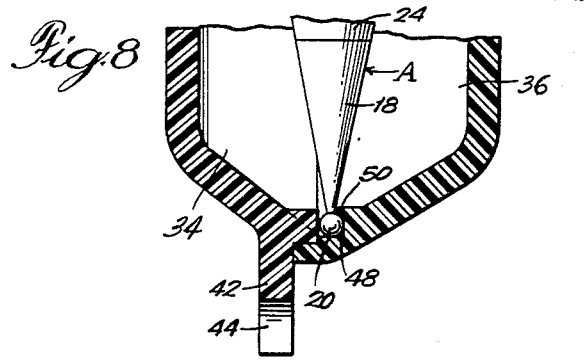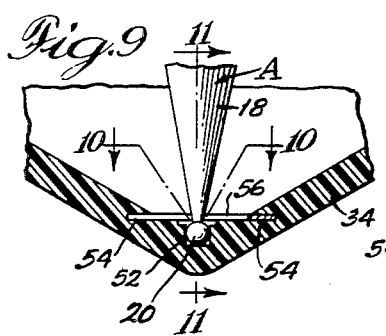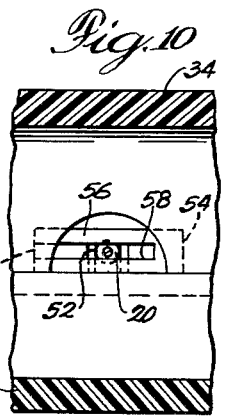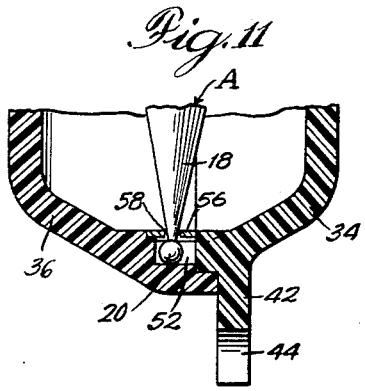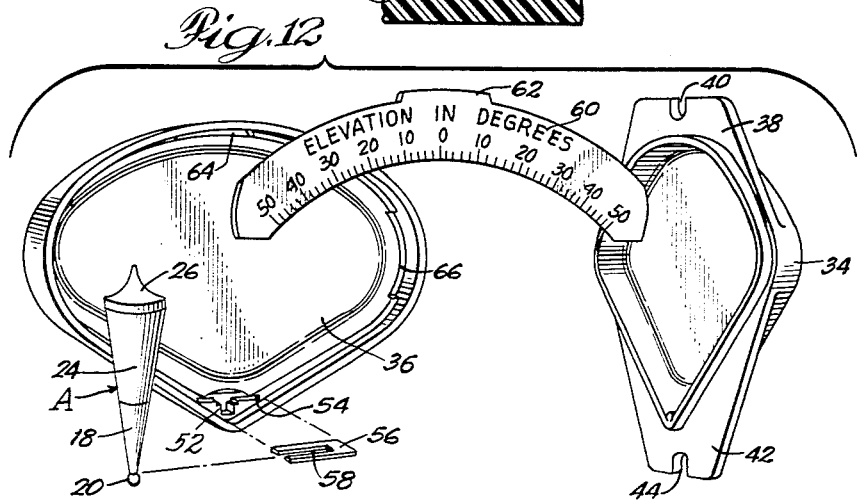

2,939,221
LEVEL

John W. Pickett, Altadena, Calif., assignor to Pickett Products, Inc., Alhambra, Calif., a corporation of Nevada Filed May 13, 1957, Ser. No. 658,829

7 Claims. (Cl. 33—206)

This invention relates to a level of the general type shown in the Golemon application, Serial No. 413,627, filed March 2, 1954, now Patent No. 2,841,880, issued July 8, 1958.

One object of the present invention is to provide a level of the type that utilizes a weighted float submerged in liquid as an indicating member in conjunction with a calibrated scale, and which utilizes a novel pivoting means for the weighted float and indicating member that accurately locates the pivot so as to avoid errors in the position of the indicating member with respect to the scale against which it is read.

Another object is to provide a weighted float and indicating member which is fast acting due to the design thereof comprising a weighted lower end thereof relatively small in cross section and a hollow buoyant upper end relatively large in cross section.

Another object is to provide a rectangular housing for the weighted float and indicating member which may be used in direct contact with an object, the levelness of which is being checked, and may contact either a substantially vertical or a substantially horizontal surface of the object.

Still another object is to provide a novel housing arrangement made in two parts, preferably of transparent plastic material, which parts can be cemented together in liquid-tight manner and one of which may have provisions for mounting it on a span bar.

A further object is to provide a pair of housings, each for a weighted float and indicating member and mounted on a span bar, one for vertical and one for horizontal indications, thus making the level more adaptable for use in connection with rough surfaces, elongated building elements and the like, and providing means to check the level and indicate the relative elevations between two spaced points spanned by the span bar.

Still a further object is to provide novel means to retain the pivot of the weighted float and indicating member against dislocation from a socket in which it pivots.

An additional object is to provide a novel means for retaining a scale accurately in position with respect to the housing and thereby with respect to the pivot socket for the weighted float and indicating member when the two sections of the housing are assembled together.

With these and other objects in view, my invention consists in the construction, arrangement and combination of the various parts of my level, whereby the objects above contemplated are attained, as hereinafter more fully set forth, pointed out in my claims and illustrated in detail on the accompanying drawings, wherein:

Fig. 1 is a perspective view of one form of my level;

Fig. 2 is an enlarged vertical sectional view on the line 2—2 thereof;

Fig. 2a is an enlargement of the lower portion of Fig. 2;

Fig. 3 is an enlarged vertical sectional view on the line 3—3 of Fig. 2;

Fig. 4 is a perspective view of a modified form of my level used in connection with a span bar;

Fig. 5 is an enlarged vertical sectional view on the line 5—5 of Fig. 4;

Fig. 6 is a vertical sectional view on the line 6—6 of Fig. 5;

Fig. 7 is an enlarged horizontal sectional view on the line 7—7 of Fig. 6 to show a plan view of a means to retain a weighted float and indicating member in its pivot socket;

Fig. 8 is a detail sectional view thereof as taken on the line 8—8 of Fig. 6;

Fig. 9 is an enlarged view similar to a portion of the lower end of Fig. 6 showing a modified construction;

Fig. 10 is a horizontal sectional view on the line 10—10 of Fig. 9;

Fig. 11 is a vertical sectional view on the line 11—11 of Fig. 9; and

Fig. 12 is an exploded perspective view of the parts of the level unit used in the span bar of Fig. 4 and showing the modification illustrated in Figs. 9, 10 and 11.

On the accompanying drawings I have used the reference numeral 10 to indicate a housing of one form of my level as illustrated in Figs. 1 to 3 inclusive. This housing is preferably box-like in character having a lid 12 which may be cemented in position, the housing and the lid being formed preferably of transparent plastic material. The housing 10 has a sloping bottom 14, the center of which terminates at a low point provided with a round socket 16 having a flat bottom as shown in Fig. 2a.

A weighted float and indicating member A is provided comprising a weight 18 made of suitable metal having a ball 20 at the lower end thereof and a knurled extension 22 at the upper end thereof. A hollow float 24 preferably molded of opaque plastic material is forced onto the knurled extension 22 and a float lid and indicating pointer element 26 is cemented in the upper end thereof. The point of the pointer 26 may be read against a scale 28 which, as shown in Fig. 1, may have "Elevation in degrees" indicated on one side thereof and as shown in Fig. 2, "Inches rise per foot" on the other side thereof.

The ball 20 (see Fig. 2a) is a working fit in the socket 16 without play in order to provide maximum accuracy of reading, and the housing 10 is filled with a liquid plastic or the like 31 through a filler opening in the lid 12 which has a filler plug 29 cemented therein after the liquid fill 31 is introduced in sufficient quantity to leave a small air bubble 33 as shown in Fig. 3 to take care of contraction and expansion of the liquid due to ambient temperature changes without bursting the housing 10.

The scale 28 is advantageously mounted against dislocation and inaccurate position with respect to the housing 10 by means of a pair of grooves 27 therein for the ends of the scale, and the lower edge of the scale is held against the lower ends of the grooves by the lid 12 when it is assembled in position and cemented in place.

In the form of invention shown in Figs. 1, 2 and 3 the weighted float and indicating member A is free to leave the socket 16, but whenever the level is placed in an approximately upright position the ball 20 will slide down the inclined bottom 14 into the socket 16 for immediately permitting use of the level and the reading of the pointer of the element A against the scale 28. By having the lower weighted end of the member A small in cross section and its upper buoyant end large so that the member has an arrowhead shape, the member reacts with maximum quickness to the force of gravity so that a reading can be taken immediately after the level is positioned against the object being leveled. The housing 10 is of the shape illustrated so that it may contact a top, bottom or vertical surface of an object and has notches 15 in its ends for convenience in leveling shafts, pipes and the like.

Instead of the housing 10, I show in Figs. 4 to 12 a housing comprising sections 34 and 36 designed for mounting on a span bar 32, preferably of light weight metal such as magnesium. For this purpose the housing section 34 has upper and lower ears 38 and 42 provided with notches 40 and 44 in which screws 46 are located and these screws are threaded into the span bar. The span bar itself has an opening 35 substantially the same shape as the housing section 36 to permit this section to extend therethrough as shown in Fig. 5. As shown in Fig. 4 the span bar may have two of the openings 35 and 35a at 90° to each other so that two of the level units may be mounted on the span bar, one for horizontal use and the other for vertical use.

The housing sections 34 and 36 are cemented together with the weighted float and indicating member A therein. The housing 34—36 is filled with the liquid 31 as shown in Fig. 5. The housing is then sealed by a filler plug 68 cemented in position.

It is preferable in a level of the span bar type to retain the member A against dislocation from its socket (shown at 48 in Fig. 8) and this may be accomplished by a small projection 50 extending partially over the ball 20 as illustrated. Another method is to provide notches 54 adjacent a socket indicated at 52 in Fig. 9 to receive a U-shaped clip 56 which may be formed of sheet metal and which has a slot 58 to straddle the portion of the weight 18 just above the ball 20 as shown in Fig. 11, thus retaining the ball in its socket yet permit free oscillation thereof in the plane of a scale 60.

As shown in Fig. 12, the scale 60 is provided against which the pointer 26 may be read, and the scale in this instance has a projection 62 to enter a notch 64 of the housing section 36, its ends being located by means of a pair of notches 66 (see also Fig. 6). Thus, when the housing sections 34 and 36 are cemented in assembled relationship the scale 60 is definitely located in respect to the socket 48 and by having the socket a working fit without play in a direction longitudinally of the span bar 32 as shown by the socket 52 in Fig. 9, maximum accuracy of operation is secured.

A level of the character disclosed not only checks the level condition of an object but, being calibrated, can measure the degree or amount that the object is off level or out of plumb. It indicates verticals, horizontals and all angles, slopes and pitches and does so with hairline accuracy. It is thus considerably more useful than a bubble type level. My type of level permits leveling from top, side or bottom and in a span bar it permits leveling over long or rough surfaces.

Some changes may be made in the construction and arrangement of the parts of my level without departing from the real spirit and purpose of my invention, and it is my intention to cover by my claims any modified forms of structure or use of mechanical equivalents which may reasonably be included within their scope.

I claim as my invention:

1. In a level of the character disclosed, a two-part transparent liquid filled housing having a bottom sloping towards a central point, a socket in said bottom having two complementary parts, one in each part of said two-part housing, a weighted float and indicating member having a ball at its lower end pivoted in said socket, a scale in said housing against which said pointer may be read, and means to retain said ball in said socket comprising an element extending from one part of said housing into said socket and partially overhanging said ball.

2. In a level, a transparent liquid filled housing having a bottom provided with a socket, said housing being formed of two parts and said socket being formed in one of said two parts, a weighted float and indicating member having a ball at its lower end which is a working fit in said socket, said member being of arrowhead shape, a scale in said housing to cooperate with said pointer, and means to retain said ball in said socket comprising a projection from one of said housing parts into said socket and overhanging said ball.

3. In a level, a transparent liquid filled housing having a socket in the bottom thereof, a weighted float and indicating member having a ball at its lower end received in said socket, the upper buoyant end of said member being relatively larger than the weighted lower end thereof, a scale in said housing against which the position of said pointer may be read, means to retain said ball in said socket comprising a slotted clip to overlie said ball with a portion of said weighted float and indicating member extending from said ball and located in said slot, said slot being in the plane of said scale to permit angular movement of said member in such plane.

4. A level comprising a transparent liquid filled housing having a socket in the bottom thereof, a weighted float and indicating member having a ball at its lower end which is pivoted in said socket, a scale in said housing against which said pointer may be read, and a slotted clip to retain said ball in said socket, the slot thereof being in the plane of said scale to permit angular movement of said member in such plane.

5. In a level, a span bar, a pair of level units mounted thereon, each of said level units comprising a liquid filled housing formed of two parts, a socket therein having part thereof formed in each housing part, a weighted float and indicating member in said housing and having a ball at its lower end located in said socket, one of said housing parts having a projection partially overhanging said ball to retain said ball in said socket, and a scale in said housing for said member, one of said level units being mounted in said span bar for vertical readings and the other being mounted therein for horizontal readings.

6. In a level of the character disclosed, a span bar having a pair of openings therein, a level unit in each of said openings, each of said level units comprising a two-part liquid filled housing, one of said parts having mounting lugs thereon for attachment to said span bar, a weighted float and indicating member in said housing, each of said housing parts having a socket part formed therein, said weighted member having a ball on its lower end located in the socket formed by said socket parts, one of said housing parts having a projection partially overhanging said ball to prevent its dislocation from said socket, and a scale against which the position of said member may be read, one of said housing parts having notches to receive and locate said scale relative to the pivot for said member, one of said level units being mounted for vertical readings and the other for horizontal readings.

7. In a level of the character disclosed, a span bar having a pair of openings therein, a level unit in each of said openings, each of said level units comprising a two-part liquid filled housing, one of said parts being attached to said span bar, a weighted float and indicating member pivoted in each of said housings, the pivot comprising a ball and socket, means to retain said ball in said socket comprising a slotted clip to overlie said ball with a portion of said weighted float and indicating member extending from said ball and located in said slot, said slot being in the plane of said scale to permit angular movement of said member in such plane, a scale against which the position of said member may be read, one of said housing parts having notches to receive and locate said scale relative to the pivot for said member, one of said level units being mounted at right angles to the other so that it may be used for vertical readings while the other may be used for horizontal readings.

(References on following page)

References Cited in the file of this patent

UNITED STATES PATENTS

| | | |
|---|---|---|
| 895,311 | Stettler | Aug. 4, 1908 |
| 970,729 | Lingle | Sept. 20, 1910 |
| 1,836,079 | McBride | Dec. 15, 1931 |
| 1,855,664 | Budge | Apr. 26, 1932 |
| 2,495,646 | Schultes et al. | Jan. 24, 1950 |
| 2,554,133 | Von Arx | May 22, 1951 |

FOREIGN PATENTS

| | | |
|---|---|---|
| 7,203 | Great Britain | Mar. 27, 1903 |

OTHER REFERENCES

Popular Mechanics Magazine for April 1956, page 95.
Aerial Age Weekly, May 3, 1920, page 257.